United States Patent
Russinovich et al.

(10) Patent No.: US 12,190,316 B2
(45) Date of Patent: Jan. 7, 2025

(54) CODE TRANSPARENCY SYSTEM OPERATION

(71) Applicant: Microsoft Technology Licensing, LLC, Redmond, WA (US)

(72) Inventors: Mark Eugene Russinovich, Bellevue, WA (US); Sylvan W. Clebsch, Cambridge (GB); Kahren Tevosyan, Kirkland, WA (US); Antoine Jean Denis Delignat-Lavaud, Cambridge (GB); Cédric Alain Marie Christophe Fournet, Cambridge (GB); Hervey Oliver Wilson, Bellevue, WA (US); Manuel Silverio Da Silva Costa, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 17/741,353

(22) Filed: May 10, 2022

(65) Prior Publication Data
US 2023/0368193 A1    Nov. 16, 2023

(51) Int. Cl.
*G06F 16/182* (2019.01)
*G06Q 20/38* (2012.01)

(52) U.S. Cl.
CPC ....... *G06Q 20/3829* (2013.01); *G06F 16/182* (2019.01); *G06Q 2220/00* (2013.01)

(58) Field of Classification Search
CPC .................................................. G06F 16/182
See application file for complete search history.

(56) References Cited

U.S. PATENT DOCUMENTS

| 10,735,397 B2 | 8/2020 | Ronda |
| 2004/0044739 A1 | 3/2004 | Ziegler |

(Continued)

FOREIGN PATENT DOCUMENTS

| EP | 3598333 A1 | 1/2020 |

OTHER PUBLICATIONS

Non-Final Office Action mailed on Feb. 15, 2024, in U.S. Appl. No. 17/741,348, 14 pages.

(Continued)

*Primary Examiner* — Grace Park
(74) *Attorney, Agent, or Firm* — Alleman Hall & Tuttle LLP

(57) ABSTRACT

The disclosed technology is generally directed to code transparency. In one example of the technology, a claim associated with an application is received. The claim is a document that is signed with a claim signature and that includes evidence associated with a policy, and further includes an expected set of at least one binary measurement associated with the application. The evidence is cryptographically verifiable evidence associated with the application. A trusted execution environment (TEE) is used to provide a distributed ledger. The claim is verified. Verifying the claim includes verifying the expected set of at least one binary measurement associated with the application, verifying the claim signature, and, based at least on the evidence, verifying that the application meets the policy. Upon successful verification of the claim, the claim is appended to the distributed ledger. A ledger countersignature associated with the claim is generated.

17 Claims, 5 Drawing Sheets

(56) References Cited

U.S. PATENT DOCUMENTS

| | | |
|---|---|---|
| 2006/0259763 A1 | 11/2006 | Cooperstein |
| 2007/0209073 A1 | 9/2007 | Corby |
| 2009/0126011 A1 | 5/2009 | Downen |
| 2018/0189732 A1 | 7/2018 | Kozloski et al. |
| 2018/0225661 A1 | 8/2018 | Russinovich et al. |
| 2018/0309567 A1 | 10/2018 | Wooden |
| 2019/0020480 A1 | 1/2019 | Camenisch |
| 2019/0109877 A1 | 4/2019 | Samuel |
| 2019/0303541 A1 | 10/2019 | Reddy et al. |
| 2019/0303579 A1 | 10/2019 | Reddy et al. |
| 2019/0303623 A1 | 10/2019 | Reddy et al. |
| 2019/0306173 A1 | 10/2019 | Reddy |
| 2020/0019706 A1 | 1/2020 | Zhu |
| 2020/0019707 A1 | 1/2020 | Zhu |
| 2020/0142693 A1 | 5/2020 | Neugschwandtner |
| 2020/0241929 A1 | 7/2020 | Arrasjid |
| 2020/0302562 A1 | 9/2020 | Trim |
| 2020/0364346 A1 | 11/2020 | Gourisetti |
| 2021/0056501 A1 | 2/2021 | Ravindranathan |
| 2021/0360031 A1 | 11/2021 | Novotny |
| 2022/0083683 A1 | 3/2022 | Murck |
| 2022/0108026 A1 | 4/2022 | Ortiz |
| 2022/0200787 A1 | 6/2022 | Kostman |
| 2022/0237565 A1 | 7/2022 | Dzierzanowski |
| 2022/0360450 A1 | 11/2022 | Brandenburger |
| 2023/0022112 A1 | 1/2023 | Beveridge |
| 2023/0057898 A1 | 2/2023 | Androulaki |
| 2023/0062434 A1 | 3/2023 | Wagner |
| 2023/0100342 A1 | 3/2023 | Smith |
| 2023/0117628 A1* | 4/2023 | Giffard-Burley ....... G06F 16/93 707/736 |
| 2023/0205929 A1 | 6/2023 | Vincent |
| 2023/0208644 A1 | 6/2023 | Fitzpatrick |
| 2023/0245117 A1 | 8/2023 | Higgins |
| 2023/0245118 A1 | 8/2023 | Zhu |
| 2023/0370273 A1 | 11/2023 | Russinovich |

OTHER PUBLICATIONS

"Application as Filed in U.S. Appl. No. 17/741,348", filed May 10, 2022, 34 Pages. (MS# 411372- JS-NP).

"International Search Report and Written Opinion Issued in PCT Application No. PCT/US23/013369", Mailed Date: Jun. 12, 2023, 13 Pages.

"International Search Report and Written Opinion Issued in PCT Application No. PCT/US23/013578", Mailed Date: Jun. 16, 2023, 15 Pages.

Russinovich, et al., "Toward Confidential Cloud Computing", In Journal of Queue, vol. 19, Issue 1, Jan. 2021, 28 Pages.

Singh, et al., "Enclaves in The Clouds", In Journal of Queue, vol. 18, Issue 6, Nov. 2020, 37 Pages.

U.S. Appl. No. 17/741,348, filed May 10, 2022.

U.S. Appl. No. 17/741,353, filed May 10, 2022.

Notice of Allowance mailed on Jul. 10, 2024, in U.S. Appl. No. 17/741,348, 09 pages.

* cited by examiner

CODE TRANSPARENCY SYSTEM OPERATION

BACKGROUND

Blockchain systems have been proposed for a variety of application scenarios, including applications in the financial industry, health care, IoT, and so forth. For example, the Bitcoin system was developed to allow electronic cash to be transferred directly from one party to another without going through a financial institution. A bitcoin (e.g., an electronic coin) is represented by a chain of transactions that transfers ownership from one party to another party. To transfer ownership of a bitcoin, a new transaction may be generated and added to a stack of transactions in a block. The new transaction, which includes the public key of the new owner, may be digitally signed by the owner with the owner's private key to transfer ownership to the new owner as represented by the new owner public key.

Once the block is full, the block may be "capped" with a block header that is a hash digest of all the transaction identifiers within the block. The block header may be recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain may create a mathematical proof of ownership in an entity represented by a security identity (e.g., a public key), which in the case of the bitcoin system is pseudo-anonymous.

A blockchain is one type of distributed ledger. A distributed ledger is a record of consensus with a cryptographic audit trail which is typically maintained and validated by several separate nodes.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to code transparency. In some examples, a first claim that is associated with a first application is received. In some examples, the first claim is a document that is signed with a claim signature and that includes first evidence that is associated with a first policy, and further includes an expected set of at least one binary measurement associated with the first application. In some examples, the first evidence is cryptographically verifiable evidence that is associated with the first application. In some examples, a first trusted execution environment (TEE) is used to provide a distributed ledger. In some examples, the first claim is verified. In some examples, verifying the first claim includes verifying the expected set of at least one binary measurement associated with the first application, verifying the claim signature, and, based at least on the first evidence, verifying that the first application meets the first policy. In some examples, upon successful verification of the first claim, the first claim is appended to the distributed ledger. In some examples, a first ledger countersignature that is associated with the first claim is generated.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
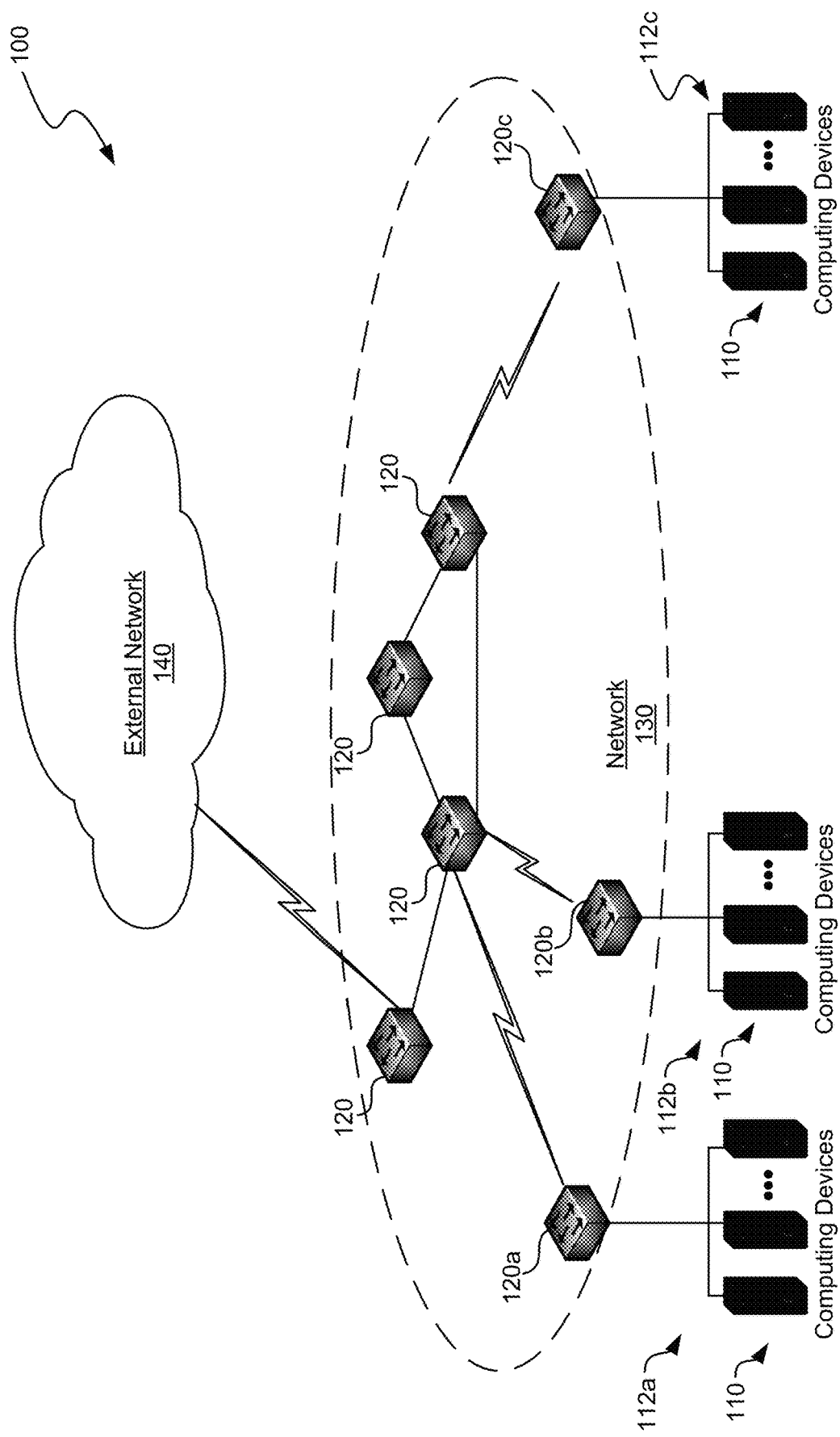
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud, but are devices that serve as an entry point into enterprise or service provider core networks. The term "document" refers to a sequence of words, tokens, items, properties, or other suitable units of data, where the sequence is capable of being indexed and uniquely identified.

Briefly stated, the disclosed technology is generally directed to code transparency. In some examples, a first claim that is associated with a first application is received. In some examples, the first claim is a document that is signed with a claim signature and that includes first evidence that is associated with a first policy, and further includes an expected set of at least one binary measurement associated with the first application. In some examples, the first evidence is cryptographically verifiable evidence that is associated with the first application. In some examples, a first trusted execution environment (TEE) is used to provide a distributed ledger. In some examples, the first claim is verified. In some examples, verifying the first claim includes verifying the expected set of at least one binary measurement associated with the first application, verifying the claim signature, and, based at least on the first evidence, verifying that the first application meets the first policy. In some examples, upon successful verification of the first claim, the first claim is appended to the distributed ledger. In some examples, a first ledger countersignature that is associated with the first claim is generated.

Confidential computing may protect the accessibility of data being processed, so that the code and data being processed in a confidential computing environment cannot be externally accessed. Confidential computing may be used to prevent outside tampering or observation with what is occurring with the boundary of the confidential computing, so that when confidential computing is used in the cloud, no third party, not even the cloud provider, can access the code and data being processed by the confidential computing. A user may wish to use code implemented by a third party, such as the cloud provider or other third party, as part of the code being processed within a confidential computing environment. However, this may create the risk that the integrity and confidentiality provided by the confidential computing could be violated by the third-party code without the user knowing that the confidentiality was violated. For example, unknown to user, the third-party code could have a back door that is difficult to detect, where the back door might leak information that is in the confidential computing environment.

A CTS instance may be used to establish trust in code that is to be used in a confidential computing environment. The CTS may authorize code in such a way that code authorized by the CTS can be trusted. In some examples, the CTS may allow a user to know for certain whether the code in a confidential computing environment can misbehave, such as misbehave by violating the confidentiality of the confidential computing environment. In some examples, the CTS instance may provide a guarantee that the authorized code is auditable. The trust established in code that is authorized by the CTS instance may enable users to use third-party code in a confidential computing environment without violating the confidentiality of the confidential computing environment.

A third-party application provider that wishes to have an application verified as trustable by the CTS instance may write a claim, where the claim is signed with a claim signature, and submit the claim to the CTS instance. In order to write the claim, the provider may compute the expected binary of the application, and obtain evidence that may be used if the application is audited. The evidence may include cryptographically verifiable evidence that the application meets one or more policies.

The executing CTS instance may provide a ledger, such as a blockchain or a non-blockchain distributed ledger. Upon receiving a claim, a trusted execution environment (TEE) in the CTS instance may verify the claim. Verifying the claim may include verifying the expected set of at least one binary measurement associated with the first application and verifying the claim signature. The verification may also include verification that the application meets the one or more policies.

The CTS may ensure compliance with various policies in various examples. In some examples, one of the policies is external archiving of source code of the application by a trusted third-party service. In some examples, one of the policies is evidence of the build of the application code by a trusted third-party reproducible build service (RBS). Upon successful verification of the first claim, the CTS instance may append the claim to the distributed ledger. The CTS instance may then generate a receipt for the claim. In some examples, the receipt is a signed statement that the claim is registered on the distributed ledger of the CTS instance.

The receipt may then be used by the third-party application provider so that users can verify that the application is compliant with the policies. In this way, users of the application can be assured of the integrity and confidentiality of the confidential computing environment in spite of the third-party application being used in the confidential computing environment.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including a local computer, on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions.

For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is a device that is configured to be at least part of a process for the operation of a code transparency service.

Illustrative Computing Device

Figure 2:
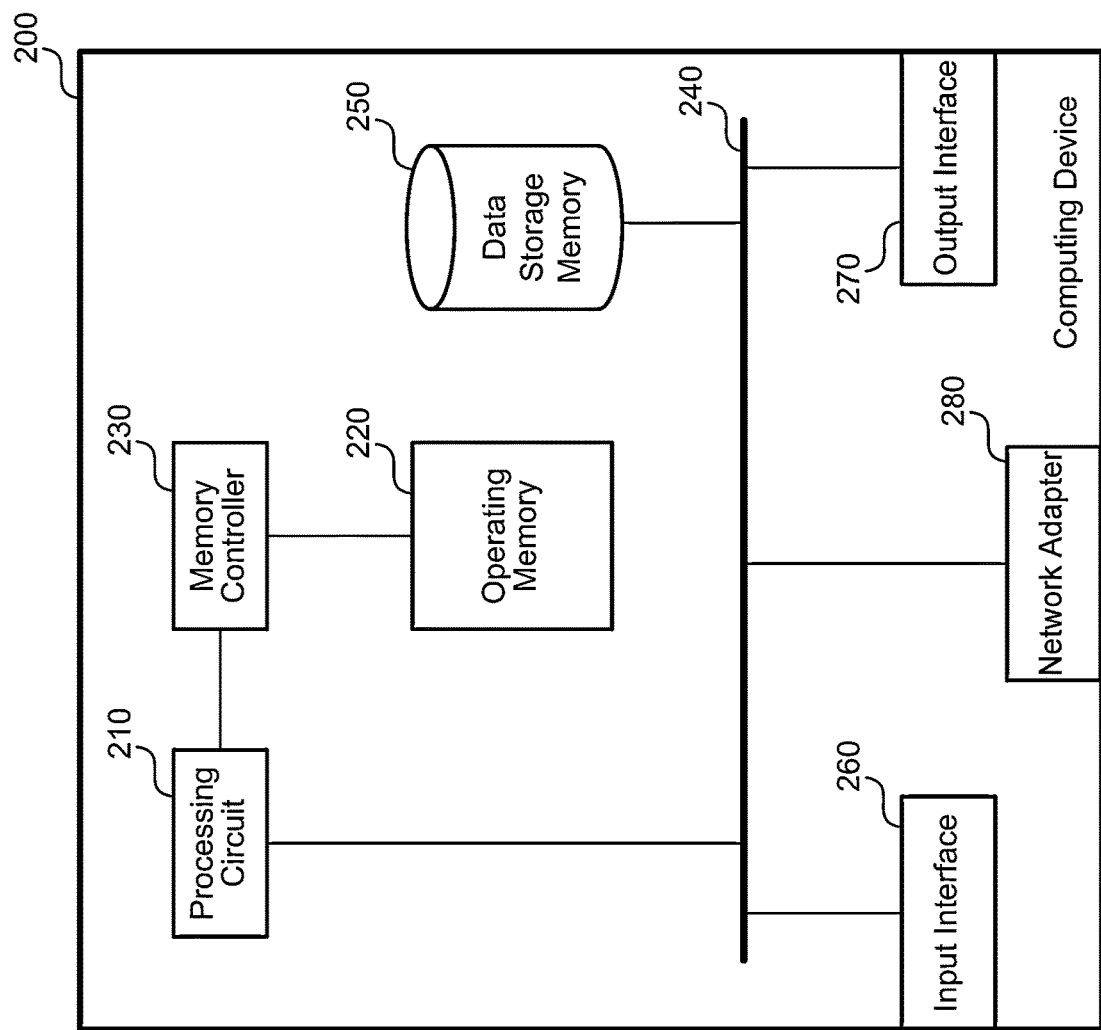
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be a server device such as an application server computer, a virtual computing host computer, or a file server computer, e.g., computing device 200 may be an example of computing device 110 or network node 120 of FIG. 1. Likewise, computer device 200 may be an example any of the devices, a device within any of the distributed systems, illustrated in or referred to in any of the following figures, as discussed in greater detail below. As illustrated in FIG. 2, computing device 200 may include processing circuit 210, operating memory 220, memory controller 230, bus 240, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, and/or technology. Processing circuit 210 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, and/or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, and/or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although FIG. 2 illustrates bus 240 as a single passive bus, other configurations, such as a collection of buses, a collection of point-to-point links, an input/output controller, a bridge, other interface circuitry, and/or any collection thereof may also be suitably employed for interfacing data storage memory 250, input interface 260, output interface 270, and/or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, and/or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for runtime data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 200 is illustrated with certain components configured in a particular arrangement, these components and arrangements are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Figure 5:
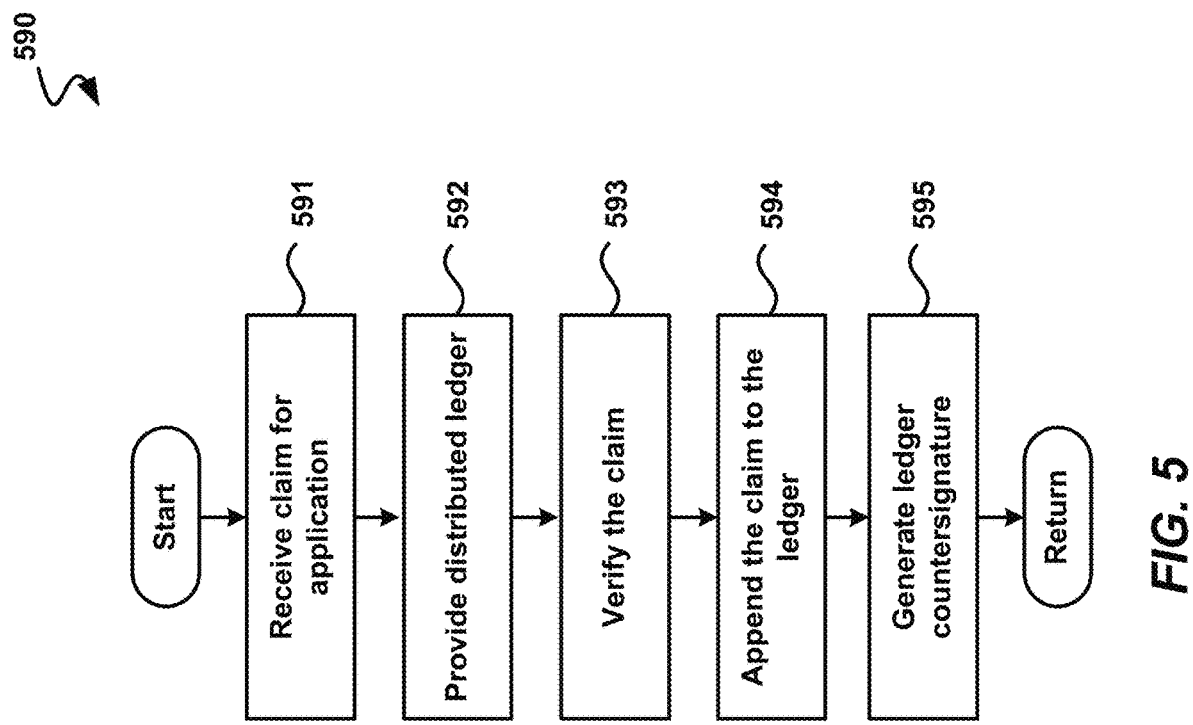
FIG. 5 is a flow diagram illustrating an example process for the operation of a CTS instance, in accordance with aspects of the disclosure.

Some examples of computing device 200 include at least one memory (e.g., operating memory 220) having processor-executable code stored therein, and at least one processor (e.g., processing unit 210) that is adapted to execute the processor-executable code, wherein the processor-executable code includes processor-executable instructions that, in response to execution, enables computing device 200 to perform actions, where the actions may include, in some examples, actions for one or more processes described herein, such as the process shown in FIG. 5, as discussed in greater detail below.

Illustrative Systems

Figure 3:
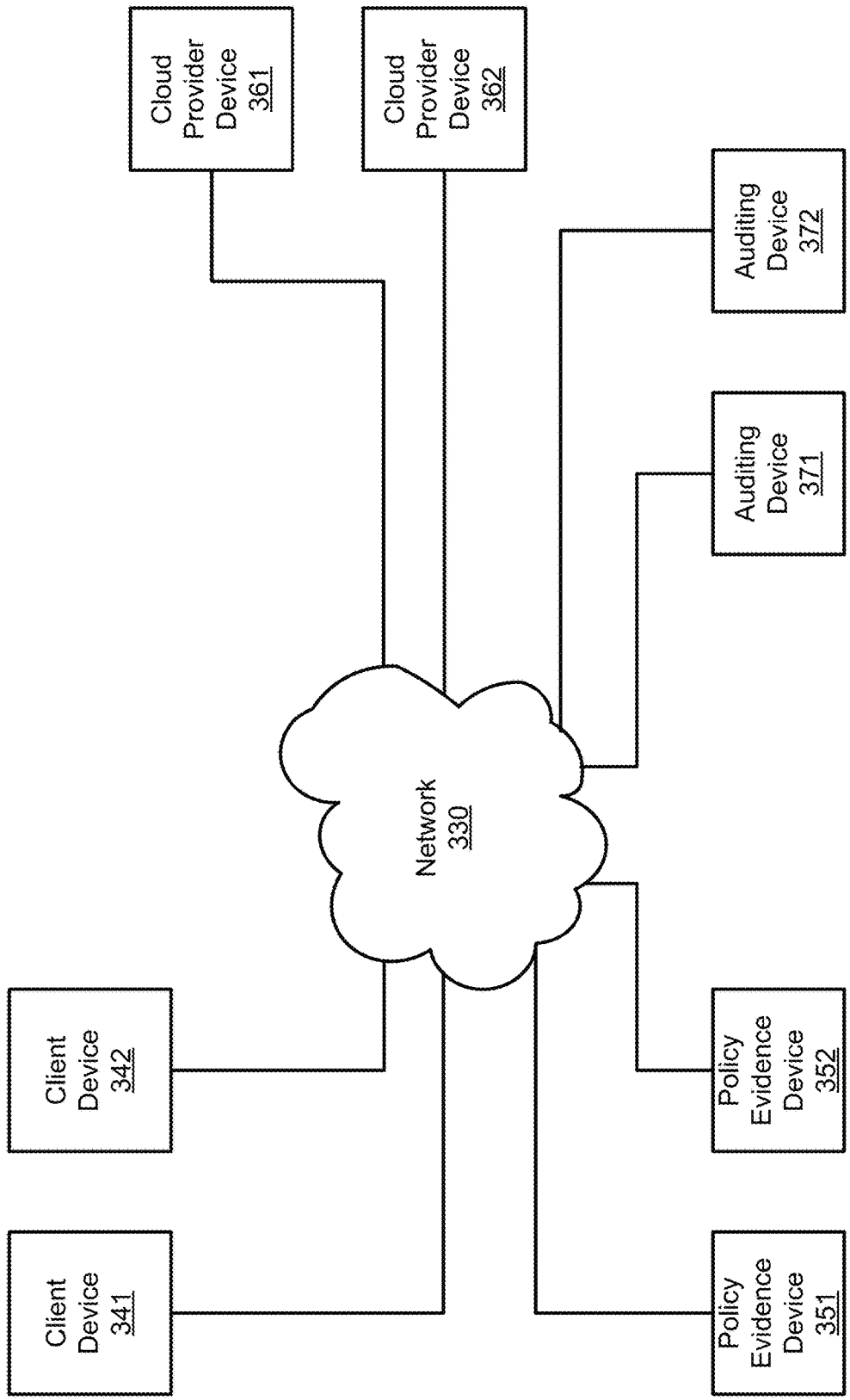
FIG. 3 is a block diagram illustrating an example of a network-connected system.

FIG. 3 is a block diagram illustrating an example of a system (300). System 300 may include network 330, as well as client devices 341 and 342; policy evidence devices 351 and 352; cloud provider devices 361 and 362; and auditing devices 371 and 372, which, in some examples, all connect to network 330.

Each of client devices 341 and 342; policy evidence devices 351 and 352; cloud provider devices 361 and 362; and auditing devices 371 and 372 may include examples of computing device 200 of FIG. 2. FIG. 3 and the corresponding description of FIG. 3 in the specification illustrate an example system for illustrative purposes that does not limit the scope of the disclosure.

In some examples, cloud provider devices 361 and 362 provide cloud services. In some examples, cloud provider devices 361 and 362 may be part of one or more distributed system(s) that provide various services, including cloud services and confidential computing services on the cloud, as well as the operation of a CTS instance. In some examples, policy evidence devices 351 and 352 are part of one or more trusted third-party services that may produce cryptographically verifiable evidence that is associated with code compliance with one or more policies. In some examples, auditing devices 371 and 372 are part of one or more auditing services that may provide auditing and endorsement of code.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, and/or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 may include any suitable network-based communication method by which information may travel among client devices 341 and 342; policy evidence devices 351 and 352; cloud provider devices 361 and 362; and auditing devices 371 and 372. Although each device is shown connected as connected to network 330, that does not necessarily mean that each device communicates with each other device shown. In some examples, some devices shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown instead communicating with each other with a different network of the multiple networks.

System 300 may include more or less devices than illustrated in FIG. 3, which is shown by way of example only.

Figure 4:
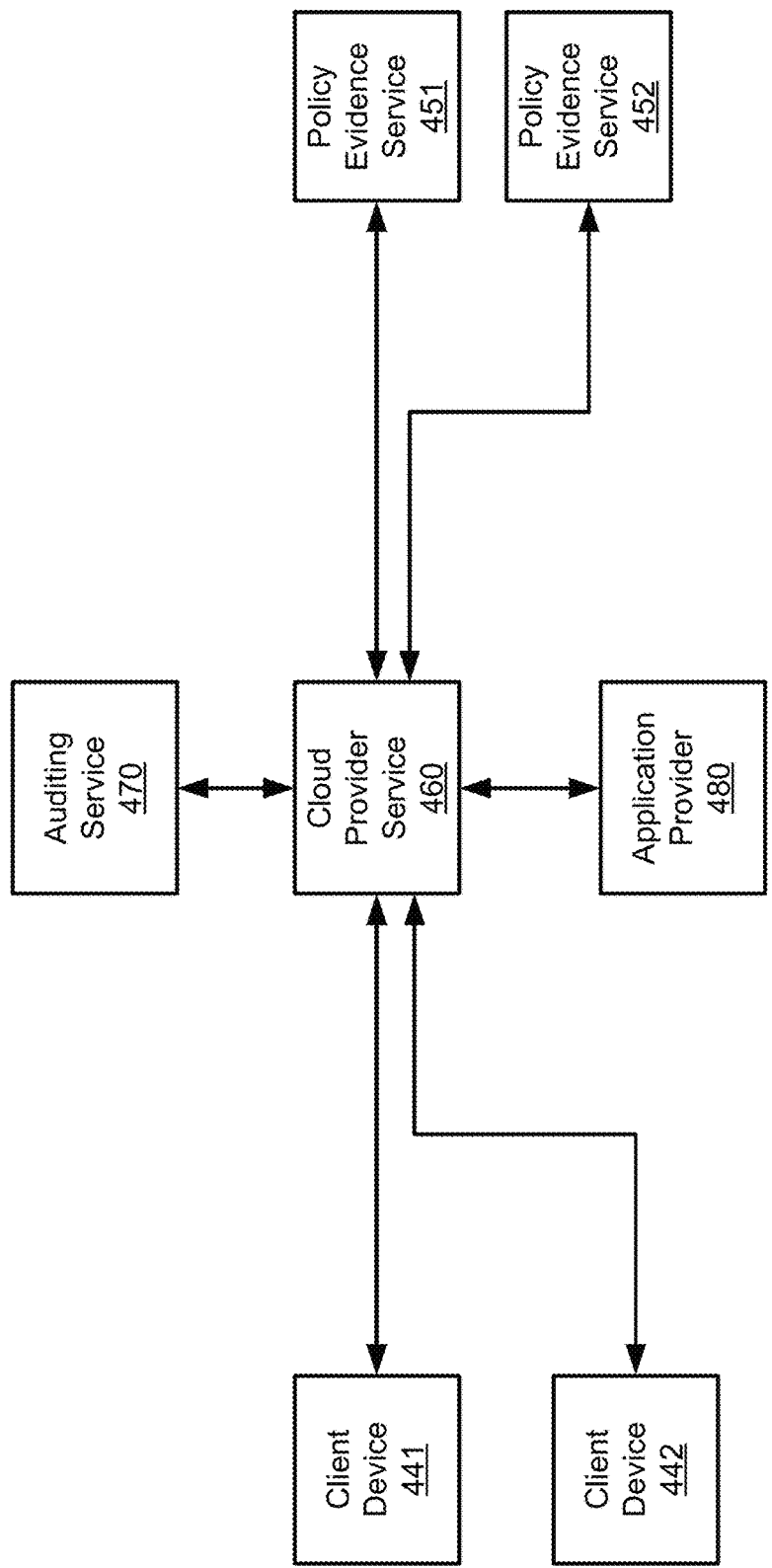
FIG. 4 is a block diagram illustrating an example of a system for the operation of a code transparency service (CTS) instance.

FIG. 4 is a block diagram illustrating an example of a system (400). System 400 may be an example of a portion of system 300 of FIG. 3. System 400 may be a system for the operation of a CTS instance. System 400 may include client device 441, client device 442, policy evidence service 451, policy evidence service 452, cloud provider service 460, auditing service 470, and application provider 480. Client devices 441 and 442 may be examples of client devices 341 and 342 of FIG. 2.

In some examples, cloud provider service 460 may include devices that include examples of cloud provider devices 361 and 362 of FIG. 3. In some examples, policy evidence service 451 and policy evidence service 452 may each include a distributed system that includes one or more policy evidence service devices (e.g., policy evidence service devices 351 and 352 of FIG. 3). Auditing service 470 may include one or more distributed systems that includes one or more examples of auditing devices 371 and 372 of FIG. 3. Application provider 480 may include one or more devices that provide a third-party application that is submitted for registration to the CTS service.

In some examples, cloud provider service 460 may provide a confidential computing environment on the cloud be behalf of clients. The confidential computing may protect the accessibility of data being processed, so that the code and data being processed in the provided confidential computing environment cannot be externally accessed. However, a user may be concerned that third-party code (such as the application provided by application provider 480) operating in the confidential computing environment may violate the confidentiality provided by the confidential computing environment.

Cloud provider service 460 may operate a CTS instance that may be used to establish trust in code (such as the application provided by application provided 480) that is to be used in the confidential computing environment. For instance, the CTS instance may authorize claims that assure compliance with one or more policies that are associated with code transparency. In some examples, for code authorized by the CTS, the CTS may allow a user to know for certain whether the code can misbehave, such as misbehave by violating the confidentiality of the confidential computing environment. In some examples, the CTS instance may provide a guarantee that the authorized code is auditable. The trust established in code that is authorized by the CTS instance may enable users to use third-party code in the confidential computing environment without risk that the cloud provider or third-party code might violate the confidentiality of the confidential computing environment.

In this way, trust in the third-party code may be achieved by code transparency. Code transparency may refer to, e.g., the ability to securely attach to a given piece of software code a collection of claims that describe its contents, record its provenance, and provide additional evidence such as code reviews or audit reports. Code transparency may further refer to the ability to publish these claims in a way that enables third parties to verify some of these claims before relying on the code.

In order for the CTS instance to properly establish trust, in some examples, the CTS instance is bootstrapped in such a way that the CTS instance itself can be trusted, and any updates performed on the CTS instance are accomplished in such a way that the updated CTS instance can be trusted. "Bootstrapping" the CTS instance refers to the process of starting up the CTS instance until the CTS instance is operational. In some examples, the bootstrapping of the CTS instance may be accomplished as follows.

The bootstrapping of a CTS instance may first begin in a single device (in cloud provider service 460) that has a TEE. In some examples, a TEE enables the creation of a protected region inside of a processor, so that the memory in the protected region is encrypted, and only decrypted inside the TEE. TEE attestation can be used to verify the code running in the TEE. In some examples, the TEE allows integrity of the calculations occurring inside the TEE and confidentiality of what happens inside the TEE.

Some examples of a TEE are based on hardware, and others are based on software. Examples of a hardware-based TEE use hardware-based protection of a memory range that defines the address range of the TEE. In some examples, writes to the TEE are encrypted. In some examples, the CPU does not allow anything outside of the address range of the TEE to see that address range in clear text, and writes from outside of the address range area not permitted in the address range of the TEE.

When a CTS bootstrap is performed, in some examples, first, initial source code for the CTS instance is provided. Next, in some examples, cryptographically verifiable evidence to establish trust in the initial source code for the CTS instance is produced. The cryptographically verifiable evidence may be evidence that the CTS code (i.e., the code that is used to operate the CTS instance) is compliant with one or more policies. The cryptographically verifiable evidence may take different forms of different examples. For instance, the cryptographical verifiability of the evidence may include, in various examples, a signature, a zero-knowledge proof, or other suitable form of cryptographic verifiability. Further, the evidence may take various forms, such as a cryptographic commitment, a pointer, a cryptographic hash, and/or the like. For instance, in some examples, evidence of storage of the CTS initial source code may include a pointer to an external storage location with a cryptographic commitment to the CTS initial source code being stored at that external storage location.

Different policies for the CTS code may be enforced in different examples. In some examples, one of the policies is external archiving of the initial CTS source code by a trusted third-party service. In some examples, one of the policies is evidence of the build of the CTS code by a trusted third-party reproducible build service (RBS). In some examples, one of the policies is a policy that the CTS code is code-reviewed by a third party. In some examples, one of the policies is a statement by an external build auditing system that the pipeline of the CTS during operation of the CTS code is secure. Other suitable policies may be enforced in other examples.

In some examples, the policies used in the bootstrapping of the CTS instance are external archiving of the CTS code and that the CTS code is reproducibly buildable. As discussed above, in some examples, compliance with each of these policies is established by a separate trusted third party. By ensuring compliance with these two policies, in some examples, the CTS instance ensures that the CTS code is auditable. Accordingly, by using these two policies, trust may be established in the CTS code in that the client is able to determine, at any time, what code was accessing the client's data in the confidential computing environment.

The initial binary of the CTS instance may be executed in the Trusted Execution Environment (TEE) in the device in cloud provider service 460 that is used to bootstrap the CTS instance. The TEE may provide a ledger, on which the evidence may be stored. The TEE may determine measurements of the binary. The TEE may generate a CTS service key that is to be used for cryptographic operations to be performed by the CTS instance. The CTS service key may be generated as runtime values produced by the TEE. The CTS service key may be a public-private key pair that is used during the normal operation of the CTS service to sign statements on behalf of the CTS service. In some examples, the CTS service key represents the identity of the CTS service and is used to endorse statement on behalf of the CTS service.

The TEE may also perform attestations, including attestations of: the measurements, the cryptographically verifiable evidence used to establish trust in the code for the CTS instance, and the CTS service key. Auditing service 470 may endorse the CTS instance in some way, such as, for example, by endorsing the CTS service key via a signature. The CTS instance may be endorsed in other suitable ways in other examples. In some examples, the endorsement is recorded on the ledger. The endorsements may also be done in different parts of the bootstrap process in various examples.

The CTS instance may add additional TEEs, so that the ledger becomes a distributed ledger with multiple nodes, and the CTS instance becomes a distributed network. The distributed ledger may be a blockchain, or a suitable distributed ledger other than a blockchain. In some examples, when a new node is added to a CTS instance, evidence of the code identity of the new node must already be present on the ledger for the new node, so that only nodes that match the most recent code identity are accepted.

After bootstrapping, the CTS instance may begin normal operation, in which the CTS instance begins accepting code claims to register. Once the CTS instance has begun running, in some examples, the CTS enforces policies in an automated, self-sufficient manner, including enforcing policies for upgrades of the CTS code itself, and enforcing policies for other code that is submitted for registration to the CTS instance.

When a user wishes to verify the suitability of a CTS instance, the user may, via a client device (e.g., client device 441 or client device 442) request, from the CTS instance, a receipt of the endorsement of the CTS instance from the auditor of the CTS instance. In some examples, the receipt proves that the CTS instance has been bootstrapped and has been authorized by the auditor. In some examples, the verification may be performed online or offline. In some examples, the receipt may include hardware attestation reports and correspondence to evidence, which the user may verify as part of the validation by the user. In some examples, a user may, at the time that the user initializes, validate an attestation service and from that point forward rely on the attestation service to perform CTS validations and provide tokens that include additional claims that the user can chose to validate.

An application provider, such as application provider 480, may provide application code to be registered by the CTS instance. Application provider 480 may then compute the expected binary measurement that will be produced by the TEE. Application provider 480 may then obtain evidence for trust in the application that will be included in the claim that is to be registered for the application. The evidence may include cryptographically verifiable evidence used to establish trust in the application, including, for example, cryptographically verifiable evidence that the code is compliant with one or more policies.

For instance, in some examples, the evidence includes evidence that the code is externally archived from a trusted third-party archiving service, and evidence from a trusted third-party reproducible build service (RBS) that the build is reproducible. In some examples, the evidence may also include any other evidence that an auditor might use in order to audit the code. For example, if the code is in GitHub, the evidence may include the commit a GitHub link to the code.

Next, application provider 480 may write a claim to submit for registration. In some examples, the claim is a document that is signed with a claim signature and that contains the expected binary measurement of the application to be registered by the CTS instance and the evidence for the application. In some examples, the claim is signed using distributed identity (DID) key management. Next, application provider 480 may submit the claim to the CTS instance.

The CTS instance (running on cloud provider service 460) may receive the claim and then a TEE on the CTS instance may verify the claim. This verification may be referred to as CTS validation of the claim, and a claim or application which has been validated based on CTS validation may be referred to as CTS validated. The verification of the claim includes, in some examples, verification of the signature on the claim. The verification of the claim may also include verifying the claim signature. The verification of the claim may also include verifying that the claim meets the registration policies necessary for the code to be approved by the CTS service. Upon successful verification of the claim, the CTS instance may append the claim to the distributed ledger of the CTS instance. In some examples, the distributed ledger is an immutable ledger which the CTS has the sole ability to update.

The CTS instance may then generate a receipt for the claim. In some examples, the receipt is a ledger countersignature that is a signed statement that the claim is registered on the distributed ledger. In some examples, the receipt is signed by a key that is endorsed by the CTS service key. In some examples, the receipt contains (1) a cryptographic construction to prove that evidence has been stored on the ledger, and (2) a signature of the root of the tree of the distributed ledger, which indicates the state of the CTS service at the time that the receipt was issued. The CTS instance may then provide the attestation and the receipt to application provider 480.

Application provider 480 may subsequently use the receipt to prove to users of client devices (e.g., client device 441 and 442) that the application is compliant with the policies. For instance, in some examples, the receipt may be used to prove to users that the application can be audited. For some use cases (e.g., Lo firmware), according to some examples, a user requires signatures instead of receipts. In some examples, a user may make use of a Confidential Signing Service (CSS) that signs a binary if and only if the CSS is given a CTS Artifact receipt for that binary that allows a user that trusts that CSS to treat the signed binary as authoritative. In some examples, the CSS itself is CTS authorized on the same CTS instance for which the CSS signs.

In some examples, the CTS service stores a usage policy artifact on the distributed ledger. In some examples, the usage policy artifact includes decentralized usage policies that are statements about how other CTS artifacts should be used. For example, the author of a container image may have a usage policy for that container image to inform users which versions have security vulnerabilities. Separately, an application provider (e.g., application provider 480) may have a usage policy that indicates to users what CTS evidence they should require to establish trust in that application.

Various guarantees may be provided for code authorized by the CTS in various examples. For instance, in some examples, a guarantee is provided that the authorized code has trustworthy behavior. In some examples, this is accomplished by the CTS guaranteeing policy compliance, using policies that establish that code authorized by the CTS must be trustworthy. In some examples, the CTS service stores a CTS acceptance policy artifact on the distributed ledger, where the CTS acceptance policy artifact includes statement about what policies a claim must have in order for the CTS service to validate the claim.

In some examples, a guarantee of the detection of any misbehavior of the code authorized by the CTS is provided. In some examples, this guarantee is accomplished by having one of the policies enforced be a requirement for evidence that the code is reproducibly buildable from a trusted third-party RBS that has been endorsed by auditing service 470, with the evidence being registered in the CTS (including being stored on the immutable ledger of the CTS). In some examples, if a user shows a CTS-signed attestation code for which evidence is unavailable, the code proves lineage and guarantees that any violation of policy will be evident in the CTS ledger, providing guarantee of misbehavior detection. In some examples, misbehaving implementations will be auditable if they are on the ledger since it will be possible to reproducibly build them, and the only reason one won't be on the ledger is that the ledger has been truncated or the build evidence is withheld, which are themselves evidence of likely misbehavior.

In some examples, auditability of the code is guaranteed. In some examples, this is accomplished by having the policies enforced include at least the two following policies. In some examples, one of the policies enforced is a requirement for evidence that the code is reproducibly buildable from a trusted third-party RBS that has been endorsed by auditing service 470, with the evidence being registered in the CTS (including being stored on the immutable ledger of the CTS). In some examples, another of the policies enforced is a requirement for evidence of external archiving from a trusted third party. In some examples, the external archiving is outside of the control of the CTS operator or the application provider. In some examples, instead of a trusted third party, the external archiving is in a public location, such as a public ledger or a source code repository. In some examples, when an archiving service has archived code, it signs its endorsement on the evidence, guaranteeing that a customer can gain access to the code.

A user who wishes to use a make use of confidential computing provided by cloud provider service 460 and who wishes to use an application from application provider 480 in the confidential computing environment may use a client device (e.g., client device 441 or 442) to do the following. The user may use the client device (e.g., client device 441 or 442) to connect to application provider 480. In response, application provider 480 may return the attestation of the code and the receipt to the client device of the user. The user may then verify that the binary measurement(s) in the claim matches the attestation, and verify the receipt. The user may also verify that the claims meet the usage policies required by the user. In some examples, the usage policy indicates the evidence that is required by the user in order to establish trust in the application.

In some examples, the policies used in the claim include evidence of external archiving of the code and that the code is reproducibly buildable. As discussed above, in some examples, compliance with each of these policies is established by a trusted third party. In some examples, by ensuring compliance with these two policies, the CTS instance ensures that the code is auditable. Accordingly, by using these two policies, trust may be established in the code in that the client is able to determine, at any time, what code was accessing the client's data in the confidential computing environment. In some examples, these two policies ensure that that a complete record of the code (and evidence of confidentiality) is immutably recorded such that a client can audit the code, including inspecting the source code.

In some examples, as discussed above, the CTS instance may be used to register a claim for confidential code that is to be run in a confidential computing environment. However, the CTS instance may be used to register claims for any suitable code, not just code that is to be run in a confidential computing environment. In some examples, some of the third-party code may be code provided by cloud provider service 460, rather than code provided by a third-party application provider other than the cloud service provider.

Cloud provider service 460 may also provide a confidential computing environment on behalf of its clients via providing TEEs in the cloud, and the third-party applications registered by the CTS service can run in the confidential computing environment without risk to the clients that the confidentiality of the confidentiality computing environment has been violated. In these examples, either the policies will have been honored, or there will be evidence that the policies have not been honored.

In some examples, the CTS service maintains a CTS public key and node history. More specifically, in some examples, the CTS service logs its signed public keys to the distributed ledger along with the proof that the CTS service has access to the previous private key. In some examples, the CTS service logs all nodes that are or have been in the network, including their attestation reports, code identity, and public keys.

In some examples, an application that is a confidential service provided by application provider 480 or another application provider can be upgraded in an automated fashion that ensures that a new version of the confidential service complies with CTS policy. In some examples, this is accomplished as follows. A new instance of the confidential service is launched side-by-side with the active instance of the confidential service. The active instance is then instructed to transfer its secrets to the new instance, at which point the active instance checks to see if the new instance is CTS-authorized. If the new instance is CTS-authorized, then the active instance rotates its signing key and then shares the updated key with the new version. This may prevent the new version from signing artifacts using the identity of an older version. The new instance then rotates its key, deauthorizing the previous version of the key. Next, all key rollover and instance upgrades are recorded in the CTS ledger. A user can subsequently obtain a receipt for CTS artifact that records the upgrade and then verifies the receipt.

In some examples, a CTS instance may be updated based on a new version of the CTS code as follows. First, in some examples, CTS update code for the update of the CTS instance is provided. Next, in some examples, cryptographically verifiable evidence to establish trust in the CTS update code is produced. The cryptographically verifiable evidence may be evidence that the code that is used to update the CTS instance is compliant with one or more policies, which may be the same policies used during the CTS bootstrapping.

Next, in some examples, the CTS binary is updated based on the CTS code update, and the updated CTS code is registered on the CTS instance. A receipt may be provided upon successful registration of the updated CTS code. Next, in some examples, the updated CTS binary, the evidence, and the receipt of the CTS registration is submitted to a CTS governance endpoint. Next, in some examples, a TEE on the CTS instance verifies the evidence and the receipt of the CTS registration.

In some examples, the TEE verifies not just the current update, but the entire lineage for the CTS code. Accordingly, in some examples, the TEE verifies all of the updates to the CTS code back to the bootstrapping of the CTS code. After successful verification, in some examples, the CTS code update may be approved. In some examples, on approval, a binary hash is written in an authorized measurement table. In some examples, after the code is approved, the CTS update may be deployed. In this way, the CTS system may provide for fully automated updates to the CTS code.

Above examples discussed a cloud provider service that both (1) performs cloud services, including providing a confidential computing environment, and (2) performs the CTS service to ensure code transparency in third-party code used in the confidential computing environment. However, in other examples, the confidential computing service and the CTS service may be separate services provided by separate entities.

Illustrative Processes

FIG. 5 a diagram illustrating an example dataflow for a process (590) for the operation of a CTS instance. In some examples, process 590 may be performed by an example of one of the cloud provider devices 361 and/or 362 of FIG. 3, by an example of cloud provider service 460 of FIG. 4, by an example of device 200 of FIG. 2, or the like.

In the illustrated example, step 591 occurs first. At step 591, in some examples, a first claim that is associated with a first application is received. In some examples, the first claim is a document that is signed with a claim signature and that includes first evidence that is associated with a first policy, and further includes an expected set of at least one binary measurement associated with the first application. In some examples, the first evidence is cryptographically verifiable evidence that is associated with the first application. Next, in some examples, a first trusted execution environment (TEE) is used to perform steps 592-595. At step 592, in some examples, a distributed ledger is provided.

As shown, step 593 occurs next in some examples. At step 593, in some examples, the first claim is verified. In some examples, verifying the first claim includes verifying the expected set of at least one binary measurement associated with the first application, verifying the claim signature, and, based at least on the first evidence, verifying that the first application meets the first policy. In some examples, upon successful verification of the first claims, steps 594 and 595 are performed next. At step 594, in some examples, the first claim is appended to the distributed ledger. As shown, step 595 occurs next in some examples. At step 595, in some examples, a first ledger countersignature that is associated with the first claim is generated. The process may then advance to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
    a device including at least one memory having processor-executable code stored therein, and at least one processor that is adapted to execute the processor-executable code, wherein the processor-executable code includes processor-executable instructions that, in response to execution, enable the device to perform actions, including:
        receiving a first claim that is associated with a first application, wherein the first claim is a document that is signed with a claim signature and that includes first evidence that is associated with a first policy, and further includes an expected set of at least one binary measurement associated with the first application, wherein the first evidence is cryptographically verifiable evidence that is associated with the first application;
        using a first trusted execution environment (TEE) to:
            provide a distributed ledger;
            verify the first claim, wherein verifying the first claim includes verifying the expected set of at least one binary measurement associated with the first application, verifying the claim signature, and, based at least on the first evidence, verifying that the first application meets the first policy; and
            upon successful verification of the first claim:
                append the first claim to the distributed ledger; and
                generate a first ledger countersignature that is associated with the first claim, wherein the first ledger countersignature includes a signature of a root of a tree of the distributed ledger.

2. The apparatus of claim 1, wherein the first ledger countersignature includes a cryptographic construction that includes proof that at least the first evidence has been stored on the distributed ledger.

3. The apparatus of claim 1, wherein the first ledger countersignature is associated with at least one guarantee, and wherein the at least one guarantee includes a guarantee of auditability of the first application.

4. The apparatus of claim 1, wherein the first ledger countersignature is associated with at least one guarantee, and wherein the at least one guarantee includes a guarantee of detection of misbehavior of the first application.

5. The apparatus of claim 1, wherein the first policy is a policy of archiving source code of the first application.

6. The apparatus of claim 1, wherein the first policy is a policy of reproducibly building a binary of the first application.

7. The apparatus of claim 1, wherein the first claim is signed with the claim signature using distributed identity key management.

8. The apparatus of claim 1, the actions further including:
    executing a first instance of a service that is associated with the first application; and
    upgrading the first instance of the service to a second instance of the service, the upgrading including:

launching the second instance of the service;

causing a transfer at least one secret of the first instance from the first instance to the second instance;

causing the first instance to verify whether a claim that is associated with the second instance has been successfully verified by the first TEE;

upon successful verification by the first instance that the second instance has been successfully verified by the first TEE, causing the first instance to update a signing key that is associated with the first instance and to share the updated signing key with the second instance; and recording information that is associated with the upgrade on the distributed ledger.

9. The apparatus of claim 1, wherein the first claim further includes second evidence that is associated with a second policy, the second evidence is cryptographically verifiable evidence that is associated with the first application, and wherein verifying the first claim further includes, based at least on the second evidence, verifying that the first application meets the second policy.

10. The apparatus of claim 9, wherein the first policy is a policy of archiving source code of the first application, and wherein the second policy is a policy of reproducibly building a binary of the first application.

11. A method, comprising:

at a first code transparency service (CTS) instance, receiving a first claim that is associated with a first application, wherein the first claim is a document that is signed with a claim signature and that includes first evidence that is associated with a first policy, and further includes an expected set of at least one binary measurement associated with the first application, wherein the first evidence is cryptographically verifiable evidence that is associated with the first application, and wherein the first policy is a policy of archiving source code of the first application;

using a first trusted execution environment (TEE) operating in the first CTS instance to:

provide a distributed ledger;

perform CTS validation of the first claim, wherein performing the CTS validation of the first claim includes verifying the expected set of at least one binary measurement associated with the first application, verifying the claim signature, and, based at least on the first evidence, verifying that the first application meets the first policy; and upon successful CTS validation of the first claim:

store the first claim on the distributed ledger; and provide a first ledger countersignature that is associated with the first claim.

12. The method of claim 11, wherein the first policy is a policy of reproducibly building a binary of the first application.

13. The method of claim 11, wherein the first claim further includes second evidence that is associated with a second policy, the second evidence is cryptographically verifiable evidence that is associated with the first application, and wherein performing CTS validation of the first claim further includes, based at least on the second evidence, verifying that the first application meets the second policy.

14. The method of claim 11, wherein the first ledger countersignature is associated with at least one guarantee, and wherein the at least one guarantee includes a guarantee of auditability of the first application.

15. A processor-readable storage medium, having stored thereon processor-executable code that, upon execution by at least one processor, enables actions, comprising:

on a first trusted execution environment (TEE) that is operating on a first code transparency service (CTS) instance, verifying a first claim, wherein the first claim is a document that is signed with a claim signature and that includes first evidence that is associated with a first policy; wherein the first claim includes an expected set of at least one binary measurement associated with a first application; wherein the first evidence is cryptographically verifiable evidence that is associated with the first application; wherein the first policy is a policy of reproducibly binding a binary of the first application; and wherein verifying the first claim includes: verifying the expected set of at least one binary measurement associated with the first application, verifying the claim signature, and, based at least on the first evidence, verifying that the first application meets the first policy; and via the first TEE, upon successful verification of the first claim:

appending the first claim to a distributed ledger that is provided by the first TEE; and generating a first ledger countersignature that is associated with the first claim.

16. The processor-readable storage medium of claim 15, wherein the first policy is a policy of archiving source code of the first application.

17. The processor-readable storage medium of claim 15, wherein the first claim further includes second evidence that is associated with a second policy, the second evidence is cryptographically verifiable evidence that is associated with the first application, and wherein verifying the first claim further includes, based at least on the second evidence, verifying that the first application meets the second policy.

* * * * *